United States Patent
Mousseau et al.

[15] 3,691,626
[45] Sept. 19, 1972

[54] TOOL CHANGE MECHANISM

[72] Inventors: Daniel J. Mousseau, Racine; Charles A. Larsen, Union Grove, both of Wis.

[73] Assignee: Gorton Machine Corporation, Racine, Wis.

[22] Filed: Sept. 10, 1970

[21] Appl. No.: 71,079

[52] U.S. Cl. ................................................29/568
[51] Int. Cl. .............................................B23q 3/157
[58] Field of Search.............................29/568, 26 A

[56] References Cited

UNITED STATES PATENTS 3,544,286  12/1970  Oeckl et al. ..................29/568
3,445,923  5/1969  Balding........................29/568

Primary Examiner—Andrew R. Juhasz
Assistant Examiner—Z. R. Bilinsky
Attorney—Donald E. Porter, Cyril M. Hajewski and William C. Gleisner

[57] ABSTRACT

An automatic tool changer assembly for a machine tool including a slide on which is mounted a tool storage magazine and a tool change arm. The slide is mounted on a spindle head which rotatably supports a tool spindle. The spindle head is movable on an axis of the machine tool. The slide is movable on the spindle head to place the tool change arm and tool magazine into an exact position with respect to the tool spindle, allowing a tool interchange to take place at any position along said axis of the machine tool.

6 Claims, 11 Drawing Figures

INVENTORS.
DANIEL J. MOUSSEAU & CHARLES A. LARSEN
BY Thomas A. Hawke
ATTORNEY

INVENTORS.
DANIEL J. MOUSSEAU & CHARLES A. LARSEN

BY

ATTORNEY

FIG. 4 — LOGIC SEQUENCE CHART

| SEQ. NO. | FUNCTION | FIG. NO. | COLLET UNCLAMP SOL 59 | TOOL DRUM C.W. SOL 65 | TOOL DRUM C.C.W. SOL 68 | TOOL ARM C.W. SOL 76 | TOOL ARM C.C.W. SOL 79 | TOOL ARM IN SOL 97 | TOOL ARM OUT SOL 84 | SLIDE FORWARD SOL 90 | SLIDE BACKWARD SOL 93 | TOOL ARM VERTICAL L.S. 101 | TOOL ARM HORIZONTAL L.S. 102 | SHOT PIN ENGAGED L.S. 103 | SLIDE BACKWARD L.S. 104 | SLIDE FORWARD L.S. 105 | TOOL ARM IN L.S. 106 | TOOL ARM OUT L.S. 107 |
|---|---|---|---|---|---|---|---|---|---|---|---|---|---|---|---|---|---|---|
| 1 | INITIAL CONDITION |  | o | o | o | o | o | — | o | o | — | o | — | — | — | o | — | o |
| 2 | DRUM ROTATES C.W. | 2 | o | 1 | o | o | o | — | o | o | — | o | — | o | — | o | — | o |
| 3 | DRUM CREEPS C.C.W. |  | o | o | 1 | o | o | — | o | o | — | o | — | o | — | o | — | o |
| 4 | SHOT PIN ENGAGED | 2A | o | o | o | o | o | — | o | o | — | o | — | — | — | o | — | o |
| 5 | SPINDLE HEAD RETRACTS | 2B | o | o | o | o | o | — | o | o | — | o | — | — | — | o | — | o |
| 6 | SLIDE MOVING FORWARD & SOCKET MOVING OUT | 2C | o | o | o | o | o | — | o | — | o | o | — | — | o | — | — | o |
| 7 | TOOL ARM ROTATING 90° C.W. | 2C | o | o | o | — | o | — | o | — | o | — | o | — | o | — | — | o |
| 8 | COLLET UNCLAMPED | 2D | 1 | o | o | o | o | — | o | — | o | — | o | — | o | — | — | o |
| 9 | TOOL ARM OUT | 2E | 1 | o | o | o | o | o | o | — | o | — | o | — | o | — | o | — |
| 10 | TOOL ARM ROTATING 180° C.W. | 2E | 1 | o | o | — | o | o | — | — | o | 1/o | o | — | o | — | o | 1/o |
| 11 | TOOL ARM IN AT 180° C.W. | 2F | o | o | o | o | o | o | — | — | o | — | o | — | o | o | — | o |
| 12 | TOOL CLAMP & ARM ROTATING 90° C.C.W. | 2G | o | o | o | o | 1/o | — | o | 1/o | o | o | 1/o | — | — | o | — | o |

INVENTORS.
DANIEL J. MOUSSEAU & CHARLES A. LARSEN

BY

ATTORNEY

TOOL CHANGE MECHANISM

BACKGROUND OF THE INVENTION

The present invention relates generally to machine tools and more particularly to a machine tool with a rotary tool spindle and having an improved tool changer assembly mounted on a slide and operative to replace a tool in the spindle.

In some systems used for tool changing it is always necessary to return the tool spindle to a reference point on the machine tool. This placed the tool spindle into an exact position with respect to the tool changing apparatus.

The present invention overcomes this problem by providing a tool changer assembly which travels with the tool spindle. When a tool change is desired, power means are actuatable to move the tool spindle back from the workpiece a short distance, sufficient to allow a tool interchange to take place. A slide mounted on the spindle head is moved forward to position the tool changing apparatus in exact position with respect to the spindle and a tool interchange takes place. The slide then moves back and the tool spindle moves forward to the workpiece having travelled the shortest distance possible to effect a tool interchange. When the slide is in its backward position, it does not interfere with the cutting operation and it stays clear of the chips and cutting oil that usually accompanies a cutting operation.

SUMMARY OF THE INVENTION

According to this invention, there is provided an improved tool changer assembly for a machine tool operable to effect an interchange of tools between the machine tool spindle and a tool storage magazine.

The tool changer assembly includes a tool change arm having two grips which are engageable with toolholders carried by the magazine and the spindle. Both the tool change arm and tool storage magazine are carried by a slide for movement with it. The slide is slidably supported by a spindle head which rotatably supports the machine tool spindle. The spindle head is supported by a saddle for horizontal movement along one of the axes of the machine tool. When a tool change is desired, the tool spindle is moved away from the workpiece. The slide carrying the tool change arm and magazine is shifted forward by a hydraulic actuator to its tool change position. The tool change arm effects the simultaneous interchange of the tool from the spindle and the tool from the tool magazine. The slide is shifted backward, moving the tool changer assembly to a position away from the cutting operations of the spindle.

An object of the present invention is to provide a tool changer assembly wherein the machine tool spindle does not have to return to a stationary reference point on the machine tool.

Another object of this invention is to provide a tool changer assembly which is positionable to a non-interfering position when a cutting operation is to be effected.

The foregoing and other objects of this invention, which will become more fully apparent from the following detailed description, may be achieved by the exemplifying apparatus depicted and set forth in the specification in connection with the accompanying drawings in which:

BRIEF DESCRIPTION OF THE DRAWINGS

FIG. 4 is a logic table that shows the sequence of steps taken to perform a tool change.

DESCRIPTION OF THE PREFERRED EMBODIMENT

Figure 1:
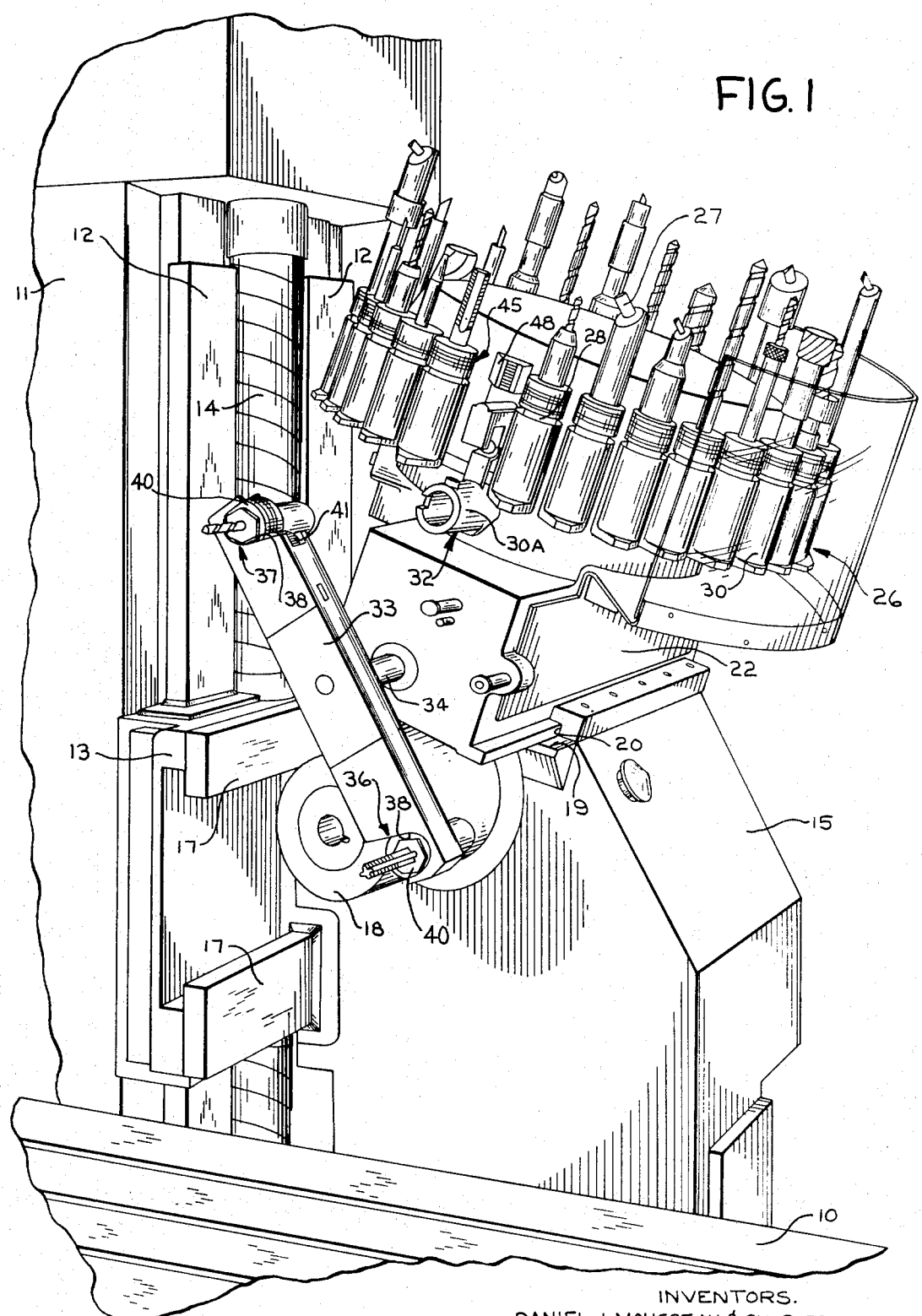
FIG. 1 is a partial perspective view of a machine tool incorporating the features of the present invention.

Reference is now made more particularly to the drawings and specifically to FIG. 1 thereof, illustrating a machine tool incorporating the features of the present invention. The machine generally comprises a bed (not shown) which slidably supports a table 10. A motor (not shown) is connected to drive the table 10 through a screw nut mechanism (not shown) in a well-known manner. An upstanding column 11 is provided with vertical ways 12 for engagement by bearings (not shown) mounted in a saddle 13 for slidably supporting the saddle in a vertical path of travel. Column 11 is aligned to the bed (not shown) assuring perpendicular movement of the saddle 13 to the table 10. Vertical movement of the saddle 13 in either direction is effected by rotating a screw located within a protective housing 14 which is in threaded engagement with a nut (not shown) that is fixed to the saddle 13. A spindle head 15 is carried by the saddle 13 and is provided with bearings (not shown) which engage complementary ways 17 affixed to the saddle 13 for supporting the spindle head 15 for a sliding cross-feeding movement in a horizontal path transverse to the direction of travel of the table 10. It is, therefore, apparent that the table 10, the saddle 13 and the spindle head 15 are each supported for movement in three mutually transverse paths of travel.

The spindle head 15 rotatably supports a spindle 18 that is adapted to carry a tool to rotate with the spindle 18 for performing a work operation. The spindle 18 is horizontally mounted within the spindle head 15. A motor (not shown) is connected to drive the spindle 18 through a transmission (not shown) in a well-known manner.

At the top end of the spindle head 15 is an inclined surface 19. A pair of spaced parallel ways 20 are rigidly secured to the inclined surface 19 and operate to support a cross slide 22 for guided movement relative to the spindle 18. Mounted on the slide 22 is an automatically operable tool changer which is operable to effect an interchange of tools between the spindle 18 and a tool storage magazine 26. The slide 22 is moved in either direction by an hydraulic actuator 89 secured on the spindle head 15. As shown in FIG. 1, a plurality of tools 27, mounted within their respective toolholders 28, are stored in the magazine 26. The tool magazine 26 is provided with a plurality of pivotable sockets 30 in which are contained the individual toolholders 28. When the toolholders are transported by the magazine 26 in a tool select indexing movement, the axis of each toolholder 28 is in an upright position. The magazine 26 is indexed to advance the selected tool to a tool change ready station, as indicated by general reference number 32. The socket 30A containing the toolholder that has been selected for an exchange is pivoted downward into a horizontal position at the tool change ready station 32, to render it accessable to a tool change arm 33. The axis of socket 30A will then be parallel to the axis of the machine spindle 18. The tool change arm 33 is secured to a horizontal shaft 34 which, in turn, is slidably and rotatably supported by bearings (not shown) mounted within the slide 22.

Tool grips 36 and 37 are provided on the ends of the tool change arm 33, as depicted in FIG. 1, and are each provided with a pair of substantially semicircular surfaces 38 for receiving a collar 40 secured to each toolholder. A spring urged roller 41 is included in the tool grips 36 and 37 for yieldably retaining the toolholders within the semi-circular surfaces 38. Since the tool grips 36 and 37, magazine 26 and tool change arm 33, per se are not a part of this invention as such, the precise mechanism for effecting the operation of the magazine, tool change arm and tool grips in a tool interchange cycle of operation has not been shown, nor is it described in detail herein. A more detailed description of the tool grips 36 and 37, magazine 26 and tool change arm 33 may be had by referring to U.S. Pat No. ReRe 25,737.

Each of the toolholders 28 is identified by a number and they are each coded in accordance with the binary system to indicate the number of the toolholder 28. To this end, the end of each of the toolholders 28 is provided with code rings generally identified by the reference number 45, as shown in FIG. 1, which constitute the coding, with each ring representing one of the digits of the binary numbering system. Some of these rings have larger diameters than others to establish the value of the digit which they represent. The larger diameter rings will represent the numeral 1 for the particular digit of the binary number, while the shorter diameter rings indicate the numeral 0 for that particular digit of the binary system.

Such coding of the toolholder 28 is read by a tool selector or reading head 48. Prior to actuating the magazine motor 64 for rotating the magazine 26 in a tool select indexing movement, the identification number of the desired tool holder is impressed upon an electrical control system, either manually or automatically in a manner well-known in the art. Then, as the magazine 26 is rotated, the tool reading head 48 will read the rings 45 on the toolholders 28 which are stored in the magazine. When the number represented by the code segments 45, read by the reading head 48, coincides with the number impressed upon the electrical control system, the electrical control system will operate to position the selected tool in the ready station 32. For a more complete description of a reading head and an associated circuit which will operate in the manner indicated, reference may be had to U.S. Pat. No. ReRe 25,737.

Figure 2:
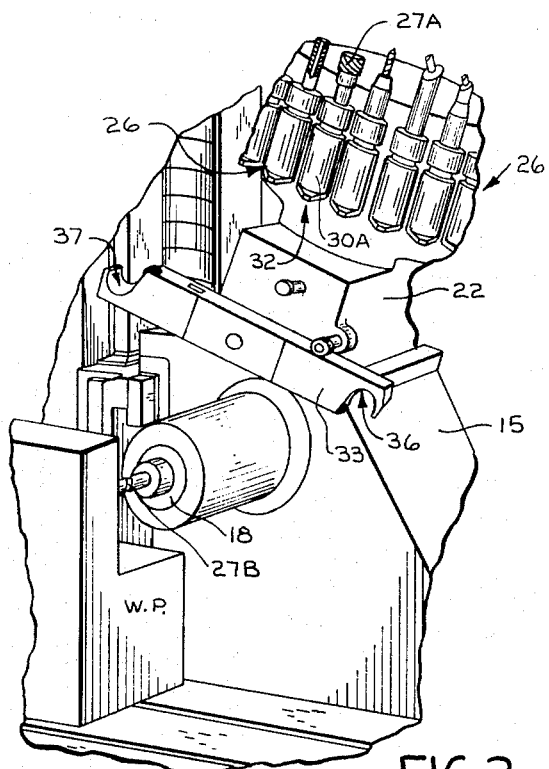
FIGS. 2 to 2G, inclusive, are a series of diagrammatic perspective views of the front of the spindle and magazine of the machine tool shown in FIG. 1, illustrating the various positions of the spindle, slide and tool change arm during a tool change cycle.
Figure 2A:
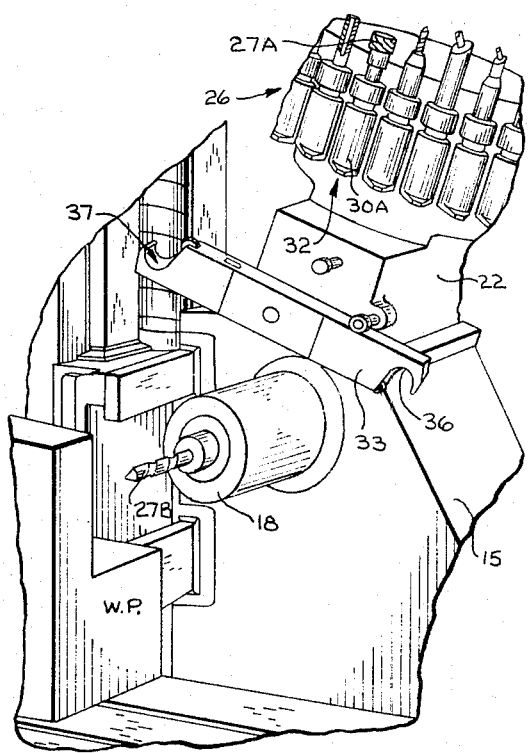
Figure 2B:
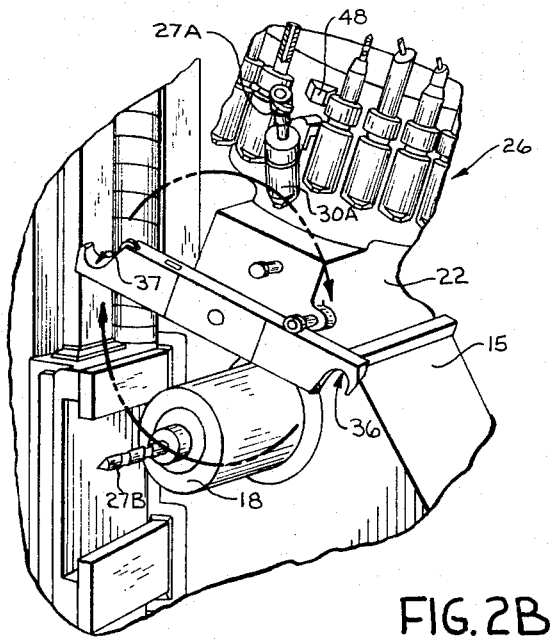
Figure 2C:
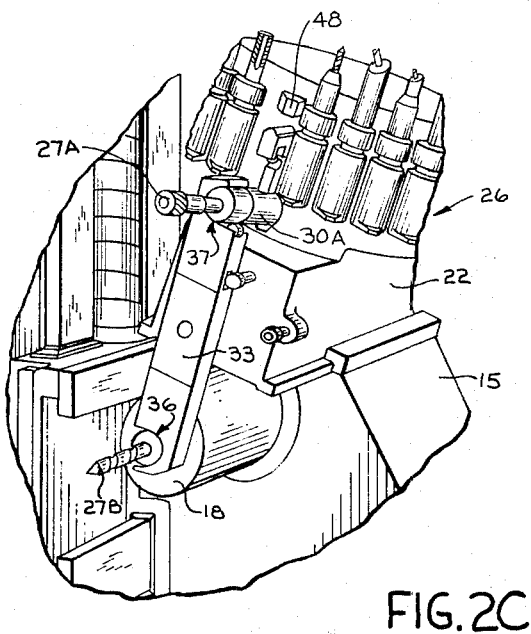
Figure 2D:
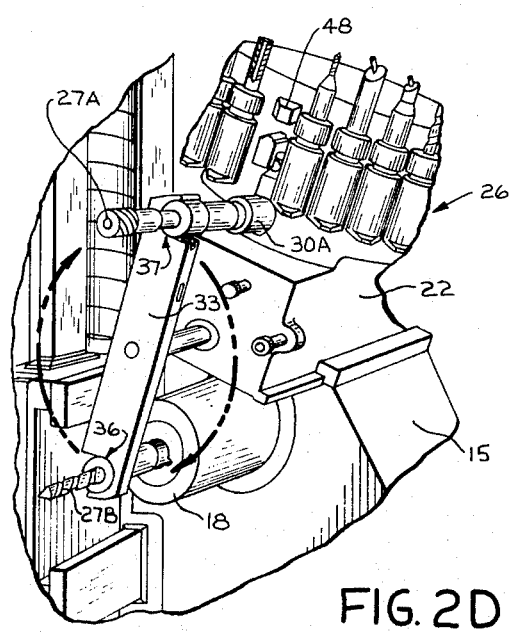
Figure 2E:
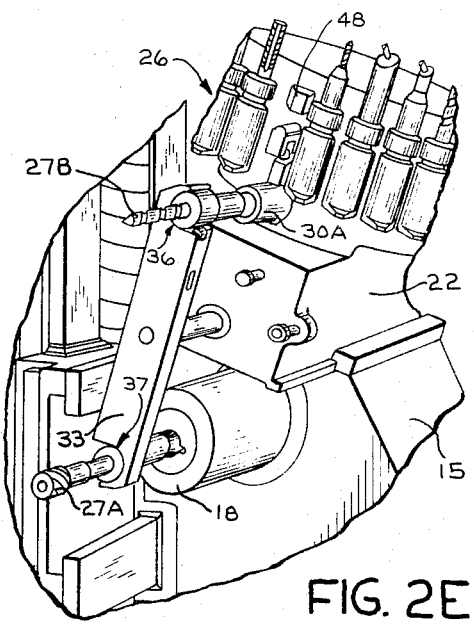
Figure 2F:
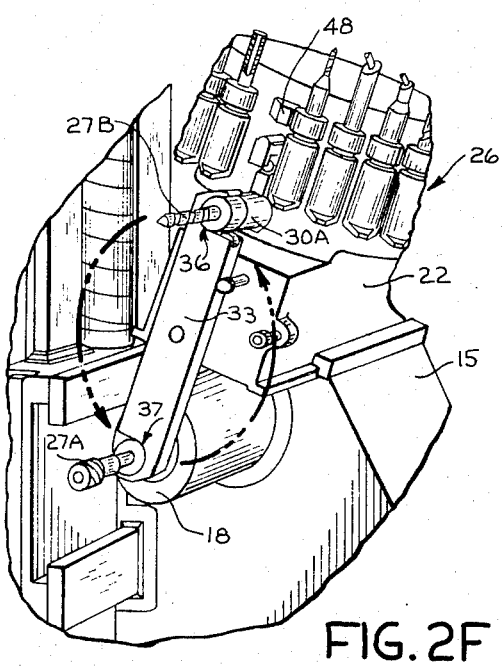
Figure 2G:
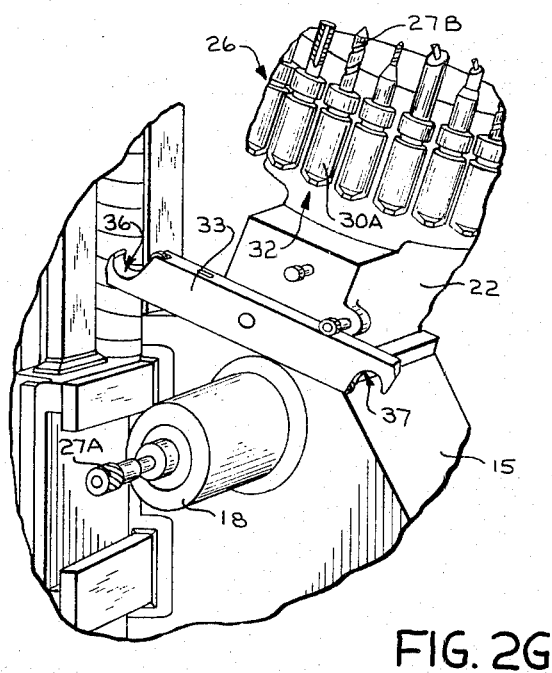

FIGS. 2 to 2G, inclusive, diagrammatically illustrate the cycle of operation of the tool change arm 33 in replacing a tool in the spindle 18. FIG. 2 shows the machine tool drilling a hole in a workpiece WP. Slide 22 is shown in its backward parked position wherein the tool storage magazine 26 and the tool change arm 33 are in a non-interfering position. The tool change arm 33 is in its parked position with the tool storage magazine 26 stopped with the selected tool 27A in an upright position at the tool change station 32. When a tool change is desired, the spindle head 15 is retracted a short distance away from the workpiece WP, as depicted in FIG. 2A. In response to a proper signal the slide 22 will begin to move from its backward position to a forward position. At the same time, the socket 30A containing the selected tool 27A is pivoted outwardly of the magazine, as depicted in FIG. 2B.

FIG. 2C depicts the slide 22 in its forward position and the socket 30A is in its horizontal position. In response to a proper signal, the tool change arm 33 is actuated in a clockwise direction, as indicated by the arrows in FIG. 2B, to pivot the tool change arm 33 from its parked position to its operative position, as illustrated in FIG. 2C. Such rotation moves the tool change arm 33 to a position wherein the grip 37 is in engagement with the tool holder containing the tool 27A as extending from the magazine 26 and the grip 36 is in engagement with the tool holder containing the tool 27B that is carried by the spindle 18. It will be observed that the tool 27A extending from the magazine 26 is a milling cutter and the tool 27B located in the spindle 18 is a drill, and the illustrative cycle shows the tool change arm 33 replacing the drill 27B in the spindle 18 by the milling cutter 27A.

With the tool change arm 33 positioned as depicted in FIG. 2C, the grips 36 and 37 have grasped the two tools for the purpose of withdrawing them from the spindle 18 and from the magazine 26. The tool change arm 33 is moved axially in a forward direction by a hydraulic unit 83 and the two tools move with it out of the spindle 18 and the magazine 26 to the position depicted in FIG. 2D.

After the two tools have been extracted from the spindle 18 and the magazine 26, the tool change arm 33 is rotated 180° in a clockwise direction, as viewed from the front of the machine and as indicated by the arrows in FIG. 2D, to the position depicted in FIG. 2E. Such rotation of the tool change arm 33 functions to move the drill 27B from alignment with the spindle 18, into alignment with the magazine 26, and the milling cutter 27A will be moved from alignment with the magazine 26, into alignment with the spindle 18. After the drill 27B and the milling cutter 27A have been interchanged by one-half of a revolution of the tool change arm 33, the latter will be retracted by the hydraulic unit 83 toward the machine, to insert the two tools into the spindle 18 and the magazine 26, respectively, as illustrated in FIG. 2F, so that the milling cutter 27A is inserted in the spindle 18 and the drill 27B is moved into the magazine 26.

From the position shown in FIG. 2F, the tool change arm is moved in a counterclockwise direction, as indicated by the arrows in FIG. 2F, to the position depicted in FIG. 2G. In this position, the tool change arm is located 180° from its position at the start of the tool change cycle and the two grips 36 and 37 have been transposed. The grips 36 and 37 are thus moved out of engagement with the respective tools and the tool change has been completed, the drill 27B has been replaced in the spindle 18 by the selected milling cutter 27A. At the same time slide 22 will have moved from its forward position to its backward position. With the slide 22 in its backward position, the tool storage magazine 26 and tool change arm 33 are in a non-interfering position when the spindle head 15 again advances to the workpiece WP to perform a cutting operation.

Figure 3:
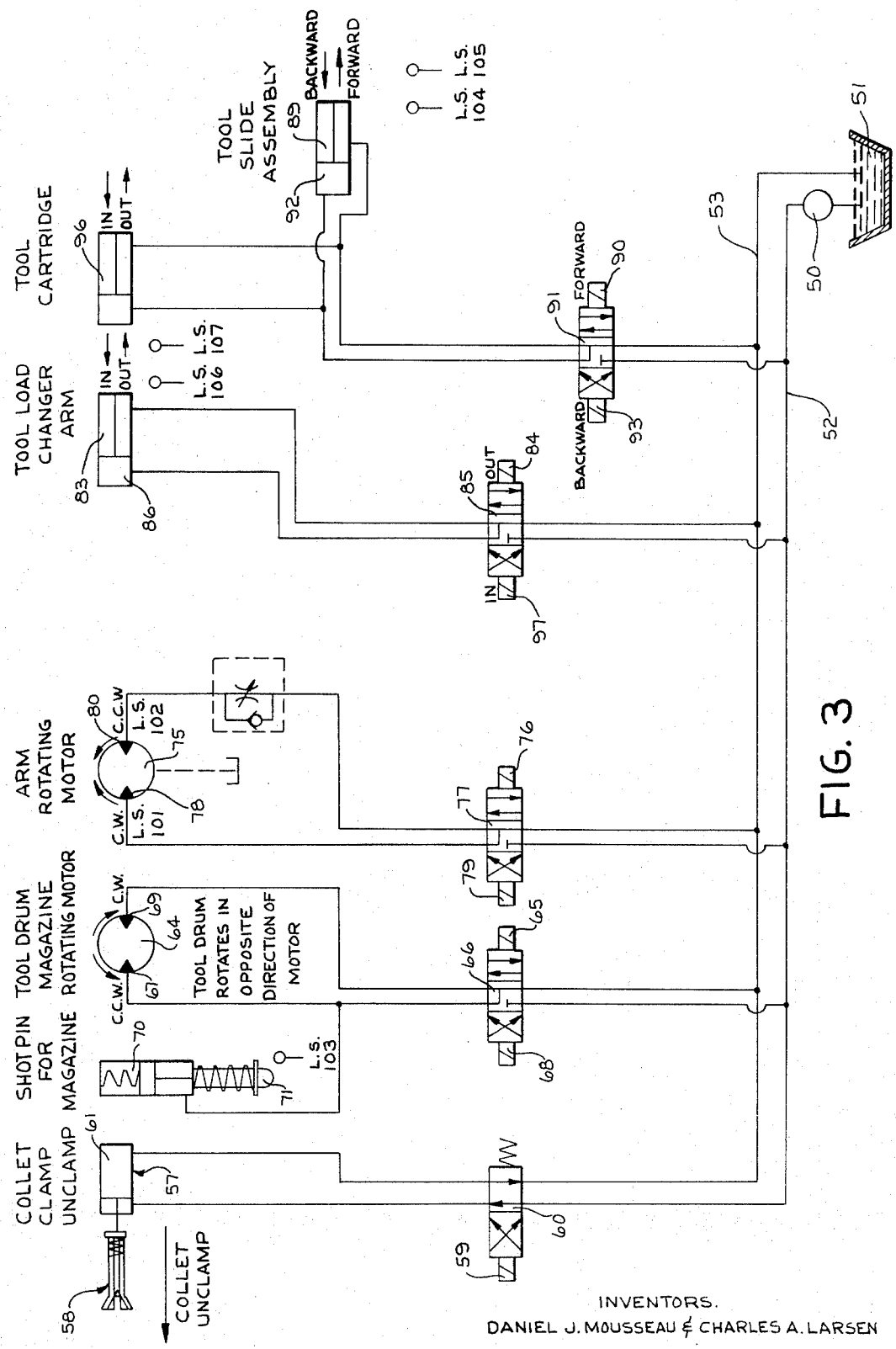
FIG. 3 is a diagrammatic view of the hydraulic circuit.

The hydraulic circuit for driving the various components described is illustrated diagrammatically in FIG. 3 and comprises a pump 50 connected to draw hydraulic fluid from a reservoir 51. The output of the pump 50 is discharged into a pressure line 52 with the exhaust fluid being carried back to the reservoir by return line 53. Hydraulic pressure from the line 52 is directed to the piston-cylinder mechanism 57 for clamping a spindle collet 58 to hold a tool in the spindle 18. Energization of solenoid 59 will actuate valve 60 to connect the pressure line 52 to the head side of piston 61 effecting the collet 58 to release the tool within the spindle. When solenoid 59 is deenergized, the valve 60 will spring return to the position shown in FIG. 3, where the pressure line is connected to the rod side of piston 61, thereby effecting the clamping of the collet on the tool held within the spindle.

Energization of solenoid 65 will actuate valve 66 to connect the pressure line 52 to the rod side of a shot pin piston-cylinder mechanism 70 effecting the disengagement of a shot pin 71 from a bore found in a plate (not shown) which is secured to the magazine 26. At the same time, the pressure line is connected to a port 67 of hydraulic motor 64 effecting the clockwise rotation of the magazine 26. When the number impressed on the reading head 48 by the coding on a particular toolholder coincides with a programmed tool number impressed in the electrical control system, a signal is transmitted to deenergize solenoid 65 thereby stopping the clockwise rotation of the magazine 26. When this occurs, the magazine 26 will have over-run the tool change station 32 in a manner that the preselected tool is advanced slightly beyond the tool change station 32. At this time, the solenoid 68 will be energized which will actuate valve 66 to connect the pressure line 52 to a port 69 of motor 64 for effecting the counterclockwise rotation at a reduced rate of magazine 26. At the same time, the exhaust line 53 will be connected to the shot pin piston-cylinder mechanism 70 effecting the shot pin 71 to be spring returned to engage the surface of the plate (not shown) which is secured to the magazine 26. Magazine 26 will rotate in a counterclockwise direction until the shot pin 71 engages a bore located on the plate secured to the magazine to accurately locate the preselect toolholder at the tool change station 32. When the shot pin 71 engages the hole in the plate, a signal is transmitted to effect the deenergization of solenoid 68 allowing the valve 66 to spring return to the position shown in FIG. 3.

Hydraulic pressure from line 52 is directed to a hydraulic motor 75 for effecting the rotation of tool change arm 33. Energization of solenoid 76 will actuate valve 77 to connect the pressure line 52 to port 78 effecting the clockwise movement of tool change arm 33. Energization of solenoid 79 will actuate valve 77 to connect the pressure line 52 to port 80 effecting the counterclockwise rotation of tool change arm 33.

Energization of solenoid 84 will actuate valve 85 to connect the pressure line 52 to the head side of piston 86 effecting the outward, extended movement of the tool change arm 33. Energization of solenoid 97 will actuate valve 85 to connect pressure line 52 to the rod side of piston 86, thereby causing the tool change arm to move to its retracted position.

Hydraulic pressure from pressure line 52 is directed to the piston-cylinder mechanism 89 for effecting the shifting of slide 22 between its backward and forward positions. Energization of solenoid 90 will actuate valve 91 to connect the pressure line 52 to the head side of piston 92 effecting the movement of slide 22 to its forward position. At the same time, valve 91 connects the pressure line 52 to the head side of piston-cylinder mechanism 96 for positioning the socket at the tool change station 32 in a horizontal position as depicted in FIG. 1. Energization of solenoid 93 will actuate valve 91 to connect the pressure line 52 to the rod sides of piston-cylinder mechanisms 89 and 96 effecting simultaneously the movement of slide 22 from its forward to its backward position and the upward pivot of the socket to its vertical position.

A description of a tool change cycle of operation will be described in conjunction with FIG. 4, which depicts a logic sequence chart describing the various conditions of the solenoids and limit switches which control the sequencing of the tool change cycle. It will be assumed that the various mechanisms are in the condition which corresponds to sequence No. 1 on the logic sequence chart wherein the spindle 18 is performing a cutting operation on a workpiece WP, the tool change arm 33 is in a retracted, parked position, the slide 22 is in its backward position where the tool change arm 33 and the tool storage magazine 26 are in a non-interfering position. With these conditions obtained, solenoids 59, 65, 68, 76, 79, 84 and 90 will be deenergized and limit switches 101, 105 and 107 will be deactuated, as depicted by zeroes in the logic chart in FIG. 4. Solenoid 93, which is energized when slide 22 is in its backward position, solenoid 97 which maintains tool change arm in retracted position, limit switch 102, which is actuated when the tool change arm 33 is in its parked horizontal position, limit switch 103, which is actuated when the shot pin is engaged with a bore in the plate attached to the magazine 26, limit switch 104, which is actuated when the tool slide is in its backward position, and limit switch 106, which is actuated when the tool change arm 33 is in its retracted position, are indicated as being actuated by the numeral 1 in the appropriate square of the logic chart in FIG. 4.

A tool select signal from the tape of the electrical control will energize solenoid 65 effecting the disengagement of the shot pin 71 from a bore found in the plate which is secured to the magazine. At the same time energization of solenoid 65 will effect the clockwise rotation of the magazine 26. Energization of solenoid 65 corresponds to sequence No. 2 of the logic sequence chart FIG. 4. When the number impressed on the reading head 48 by the coding on a particular toolholder coincides with a programmed tool number impressed in the electrical control system, a tool coincidence signal is transmitted, deenergizing solenoid 65 thereby stopping the clockwise rotation of the magazine 26. When this occurs, the magazine 26 will have over-run the tool change station 32 in a manner that the preselected tool is advanced slightly beyond the tool change station 32. At this time a signal from the electrical control will energize solenoid 68 effecting the counterclockwise rotation of magazine 26 and corresponding to sequence No. 3 of the logic chart, FIG. 4. At the same time the magazine is rotating counterclockwise, the shot pin 71 is being spring returned to engage the surface of the plate (not shown) which is secured to the frame of magazine 26. Magazine 26 will rotate in a counterclockwise direction until the shot pin 71 engages a bore located on the plate (not shown) to accurately locate the preselect toolholder at the tool change station 32. When the shot pin 71 engages the bore in the plate it will actuate limit switch 103. Limit switch 103, when actuated, will effect the deenergization of solenoid 68. The condition of the limit switch and solenoids at this time correspond to sequence No. 4 of the logic chart, FIG. 4.

When the drilling operations, as depicted in FIG. 2, is finished, the electrical control will effect the retraction of the spindle head 15 a short distance from the workpiece, as depicted in FIG. 2A, corresponding to sequence No. 5 of the logic sequence chart FIG. 4.

When the spindle head 15 retracts the distance called for by the electrical control, the electrical control will effect the energization of solenoid 90 to simultaneously effect the forward movement of tool slide 22 and the downwardly pivoting tool socket 30A containing the preselected too 27A, as depicted in FIG. 2B and corresponding to sequence No. 6.

Limit switch 105, which is actuated when the slide 22 is in its forward position, will effect the energizing of solenoid 76 which, in turn, will effect the clockwise rotation of tool change arm 33 90°. Such rotation moves the tool change arm 33 to a position wherein the grip 37 is in engagement with the toolholder containing the tool 27A as extending from the magazine 26 and the grip 36 is in engagement with the toolholder containing the tool 27B that is carried by the spindle 18, as depicted in FIG. 2C and corresponding to sequence No. 7 of the logic sequence chart.

Limit switch 101, which is actuated by the tool change arm 33 being in its vertical position, will effect the deenergization of solenoid 76, it will also effect the energizing of solenoid 59 for operating the collet mechanism in a well-known manner to release the tool 27B in the spindle 18. Deenergization of solenoid 76 and releasing the tool in the spindle occurs during sequence No. 8 of the logic chart. The tool change arm in its vertical position will also actuate a ½ second time delay logic switch in the electrical control.

After the ½ second time delay, the logic switch will effect the energizing of solenoid 84 to effect the extension of tool change arm 33 to its "out" or extended position, as depicted in FIG. 2D, corresponding to sequence No. 9 of the logic sequence chart. The outward movement of the tool change arm 33 will actuate limit switch 107.

Limit switch 107, when actuated, will effect the energizing of solenoid 76 which, in turn, will effect the 180° rotation of tool change arm 33 in a clockwise direction, and as indicated by the arrows in FIG. 2D, to the position depicted in FIG. 2E and corresponding to sequence No. 10 of the logic sequence chart.

The 180° rotation of tool change arm 33 will actuate and deactuate limit switch 102 and deactuate and actuate limit switch 101. This combination of conditions will effect the electrical control to effect the deenergization of solenoid 76 and of solenoid 84 which, in turn, will return the tool change arm 33 to its "in" or retracted position, as depicted in FIG. 2F and corresponding to sequence No. 11 of the logic sequence chart. The inward movement of the tool change arm 33 will actuate limit switch 106.

Limit switch 106, when actuated, will effect the deenergization of solenoid 59 for effecting the operation of the collet mechanism to secure the new tool 27A in the spindle 18 in a well-known manner. At the same time solenoid 79 is energized effecting the 90° rotation of tool change arm 33 in a counterclockwise direction, and as indicated by the arrows in FIG. 2F, to the position depicted in FIG. 2G. The 90° rotation of arm 33 will actuate limit switch 102, which will now effect the deenergization of solenoid 90 and the energization of solenoid 93 to simultaneously effect the backward movement of tool slide 22 and the upwardly pivoting of socket 30A containing tool 27B to the position depicted in FIG. 2G, corresponding to sequence No. 12 of the logic sequence chart FIG. 4.

The tool storage magazine may now be operated by the electrical control in a manner for selecting the succeeding tool which is to be placed in spindle 18 by the tool change arm 33.

Although the illustrative embodiment of the invention has been described in considerable detail for the purpose of disclosing a practical operative structure whereby the invention may be practiced advantageously, it is to be understood that the particular apparatus described is intended to be illustrative only and that the novel characteristics of the invention may be incorporated in other structural forms without department from the spirit and scope of the invention as defined in the subjoined claims.

The principals of this invention having now been fully explained in connection with the foregoing description, we hereby claim as out invention:

1. In a machine tool;
    a frame;
    a spindle head carried by said frame;
    a rotatable spindle journalled in said spindle head and having an operating end adapted to receive cutting tools for rotating them in a machining operation;
    a tool storage magazine mounted on said spindle head for movement therewith, and for movement in a path of travel relative to said spindle head;
    moving means for moving said magazine relative to said spindle head between a tool change position and a parked position with the movement toward said parked position being in a direction away from the operating end of said spindle so that said magazine will be spaced further from the work zone to avoid interference with the machining operation and to protect said magazine from any debris which may be produced by the machining operation; and,
    transfer means operable when said magazine is in its tool change position to extract a tool from said magazine and move it to the operating end of said spindle.

2. A machine tool according to claim 1 including:

a slide mounted on said spindle head for movement relative thereto, and wherein said tool storage magazine is mounted on said slide for movement therewith relative to said spindle head; and, said moving means is connected to move said slide for obtaining the movement of said magazine between the parked position and the tool change position.

3. A machine tool according to claim 1 including:

means connecting said transfer means for movement by said moving means in unison with said tool storage magazine so that said transfer means is moved with said tool storage magazine between a parked position and a tool change position.

4. A machine tool according to claim 2 wherein said transfer means is mounted on said slide for movement therewith in unison with said magazine so that said transfer means also moves with said slide between a parked position and a tool change position.

5. A machine tool according to claim 4 wherein said transfer means is a tool change arm that is rotatably carried by said slide with the rotary movement serving to transfer the tools between said tool storage magazine and said spindle.

6. In a machine tool having an operating station adapted to receive tools for the performance of machining operations;

a frame;

a spindle head carried by said frame;

a slide carried by said spindle head for movement relative to the operating station;

a tool storage magazine mounted on said slide for movement therewith so that said magazine can be moved between a tool change position and a parked position; and, a tool change arm carried by said slide for movement with said magazine between the tool change position and the parked position and mounted on said slide for selective rotational and translational movement to enable said arm to engage and withdraw a tool from said magazine and transport the same to the operating station for insertion therein and to simultaneously engage and withdraw a tool from said operating station and transport the same to said storage magazine for insertion therein.

* * * * *